Patented Apr. 25, 1950

2,505,353

UNITED STATES PATENT OFFICE 2,505,353

MICROPOROUS RESIN

Charles F. Fisk, Clifton, N. J., assignor to United States Rubber Company, New York, N. Y., a corporation of New Jersey No Drawing. Application June 13, 1947, Serial No. 754,593

15 Claims. (Cl. 260—2.5)

This invention relates to a microporous resin product and process of making the same. More specifically it relates to a microporous resinous product made by the polymerization of a mixture of a polyester of an ethylenic alpha,beta-dicarboxylic acid with a glycol which polyester contains unesterified or free carboxyl groups, and a liquid monomeric unsaturated polymerizable compound containing an ethylenic linkage. The products have certain advantages over microporous hard rubber.

Microporous products have in the past been made in a number of ways. Probably the most important microporous products now being produced commercially are hard rubber battery separators which may be produced in microporous form for example in accordance with the disclosures of U. S. patents to Hazell Nos. 2,112,529 and 2,181,891. An even more successful commercial method of making microporous hard rubber products suitable for use as battery separators is that disclosed in U. S. patent to Baty and Meyer No. 2,329,322 in accordance with which a preformed granular, soft, friable, partially dehydrated silica hydrogel or other inorganic oxide hydrogel having a high water content, say between 60 and 85% by weight, is intimately incorporated throughout the solid rubber mass, the resulting mixture then being shaped into the desired form and cured to a rigid or semi-rigid state under non-evaporative conditions. Although the microporous hard rubber battery separators made in this manner are extremely successful commercially, it is recognized that it would be highly desirable if a more economical processing method could be developed. Accordingly, efforts have been made to utilize synthetic resins, such as polystyrene, in place of the rubber used in the prior art formulation of microporus articles. However, when it is attempted to substitute a synthetic resin such as polystyrene for rubber the process is inoperative. Generally speaking, therefore, the method of making microporous hard rubber cannot be employed to make microporous synthetic plastic articles.

I have now discovered that a microporous synthetic resinous product may be prepared by forming a mixture of a polyester esterification product of an ethylenic alpha,beta-dicarboxylic acid with a glycol, which esterification product contains unesterified or free carboxyl groups and is soluble in the liquid monomeric unsaturated polymerizable compound containing an ethylenic linkage hereinafter described, a liquid monomeric unsaturated polymerizable compound containing an ethylenic linkage, an alkali, hydrous silica gel, water and a polymerization catalyst, and curing this mixture to a solid mass by heating the same under non-evaporative polymerization conditions.

The synthetic resins which are rendered microporous in accordance with the present invention are those described in detail in Ellis U. S. Patent 2,255,313, the disclosure of which is hereby incorporated by reference in order to avoid undue repetition. As shown in said patent, these resins are made by reacting an ethylene-alpha-beta dicarboxylic acid with a glycol, in such proportions that there are present in the reacting mixture about one carboxyl group in such unsaturated acid to one hydroxyl group in such glycol, to an advanced stage of esterification but short of becoming completely insoluble and infusible, until a product of low acid number is produced which is soluble in a liquid monomeric unsaturated polymerizable compound containing an ethylenic linkage, incorporating the product of such esterification with a liquid monomeric unsaturated polymerizable compound containing an ethylenic linkage, and thereafter subjecting said solution to conjoint polymerization. It was unexpected that the resinous materials disclosed in Ellis could be rendered microporous by the particular method disclosed herein. My invention is based on the discovery that these specific resins can be made microporous by operating in a specific manner. Thus the resin and the method of processing of the present invention co-act in a new and unexpected manner to give a very satisfactory microporous synthetic resinous article.

In accordance with the disclosure of the Ellis patent, two materials are subjected to conjoint polymerization. The two materials are in the form of a solution. The esterification product resulting from the reaction of an ethylenic alpha,-beta-dicarboxylic acid, especially maleic acid or its anhydride, with a glycol, especially ethylene glycol or diethylene glycol, is dissolved in a liquid monomeric unsaturated polymerizable compound containing an ethylenic linkage, especially styrene or diallyl phthalate, and the resulting solution is then subjected to polymerization. The improvement of the present invention resides in modifying the formulation used in the Ellis patent by the addition of materials thereto which upon the subsequent curing or heating step render the product microporous. My invention is based upon the unexpected discovery that by incorporating with the solution of resin-forming components, prior to the polymerization step, a hydrous silical gel, water, and an alkali, and carrying out the polymerization step under non-evaporative conditions, a highly microporous product is produced. Upon drying the product so produced, the water which was entrained in the solid material escapes therefrom leaving a microporous material in which the microporous structure is filled with air.

The esterification produce used as one resin-forming component is a linear polyester of the glycol and the unsaturated dicarboxylic acid. It contains characteristic ethylenic double bonds. It has been reacted to an advanced stage of esterification but short of becoming insoluble and infusible. It is soluble in the liquid monomeric unsaturated polymerizable compound containing an ethylenic linkage used as the other resin-forming component, and in fact is employed as a solution therein. The unsaturated esterification product or alkyd copolymerizes with the liquid monomeric unsaturated polymerizable material containing an ethylenic linkage, such as styrene.

It is essential that the esterification product of the glycol and the acid have a substantial acid characteristic, as indicated by an acid number which may range from 5 to 100. More commonly it will range between 5 and 70. Such products and their preparation are well known in the art. The presence of free carboxyl groups in the esterification product is essential to the present invention in order that the alkali employed in accordance with the present invention may react with these free carboxyl groups to promote the formation of the microporous structure as will appear more fully hereinafter.

The mixture of the esterification product, unsaturated material copolymerizable therewith, hydrous silica gel, alkali, water and the polymerization catalyst is usually a mobile paste before the polymerization. On heating this paste under non-evaporative conditions the resin gels and polymerizes to a thermoset, strong solid which entraps the water in an usual manner. When this entrapped water is then removed by drying, a microporous solid is obtained which is a sponge-like structure having from 50 to 60 per cent voids and having pores whose diameters are substantially all less than a few thousandths of an inch. When a drop of ink is placed on the seemingly solid product, the ink is quickly absorbed and penetrates readily through a sheet of thickness from 0.04 to 0.10 inch.

In a general way the finished microporous resinous sheet made in accordance with the present invention is physically similar to microporous hard rubber made in accordance with the patent to Baty et al. No. 2,329,322, except that the product of the present invention is chalk-white rather than yellowish brown. The formation of micropores in the resinous product in accordance with the present invention is decidedly unusual and is not well understood.

When a solution of the esterification product in styrene, for example, is merely mixed with an approximately equal volume of water, or with various aqueous solutions, or with neutral silica gels, the products obtained after polymerization and drying are not microporous and are entirely unusable for the uses to which microporous materials are put. Two types of products are commonly obtained when such a procedure is followed. The first is one in which the resin is a continuous phase entirely surrounding and occluding the water droplets; when the water is evaporated by diffusion through the continuous resin phase, shrinkage occurs so that the product is a substantially solid resin and is not at all microporous. The second type of product is one in which the resin forms discrete droplets such that after polymerization and drying a product which is easily crumbled to a powder is obtained.

In accordance with the present invention, both a hydrous silica gel and an alkali are used with the resin. Both are essential. Apparently the alkali reacts with the free carboxyl groups in the acidic alkyd polyester, forming surface-active salt groups which somehow promote the formation of the desired micropore structure. These surface-active groups are of necessity distributed throughout the alkyd, and function as a wetting agent formed in situ to promote the admixture of the organic resin-forming solution with the aqueous material including the water and the hydrous silica gel in such manner that the desired microporous structure is produced. The formulation used may vary from a thin liquid paste to a thick paste.

Synthetic resins of all types made in accordance with the teachings of Ellis Patent No. 2,255,313 can be made microporous in accordance with the present invention. The method of rendering the resin products microporous in accordance with my invention may involve the admixture with the solution of the esterification product in the unsaturated material copolymerizable therewith, such as styrene, of either (a) sodium silicate solution, or (b) approximately neutral silica sol, together with alkali such as sodium hydroxide, or (c) preformed hydrous silica gel, together with alkali such as sodium hydroxide.

Any form of sodium silicate may be used in practicing the process of the present invention. The sodium silicate may be used either as a water-soluble solid or as an aqueous solution. Examples are sodium metasilicate, sodium sesquisilicate and sodium orthosilicate. Sodium silicate having any ratio of $Na_2O$ to $SiO_2$ may be employed. For example the ratio of $Na_2O$ to $SiO_2$ may range 2:1 to 1:4.2. Where sodium silicate of low alkali content, for example a sodium silicate having an $Na_2O:SiO_2$ ratio of 1:4 is used it may of course be necessary to incorporate free sodium hydroxide into the formulation in order to form the desired amount of alkali metal salt of the alkyd to give the desired wetting action and cause the aqueous phase to mix readily with the organic phase and yield the desired microporous structure upon curing. Generally, when I use sodium silicate I use it in the form of ordinary water-glass of commerce which is generally made with a ratio of $Na_2O:SiO_2$ of about 1:3.2. Regardless of the form of sodium silicate used in carrying out my invention, those skilled in the art will be readily enabled in the light of this disclosure to select suitable ingredients and to proportion these ingredients to obtain satisfactory results.

When alkali silicate solution such as sodium silicate of commerce is used, it furnishes both the alkali metal hydroxide required to react with the alkyd in the formulation and also furnishes the hydrous silica gel since the pH of the formulation is always adjusted so as to be below 7 in order to bring about gelling of the sodium silicate. The pH of the resulting mixture may range from 5 to 6.9, for example. Anyone skilled in the art, knowing the acid number of the esterification product and the composition of the sodium silicate can work out a suitable formulation in the light of the present disclosure. The sodium silicate solution may be added to the components of the resin, namely the esterification product and the copolymerizable material, or the components of the resin may be added to the silicate solution. It is preferred to stir vigorously during the addition in order to obtain an intimate homogeneous mixture wherein there are created two continuous phases one of which is aqueous and the other of which is resinous. The key to microporosity lies in creating these two continuous phases by proper adjustment of the formulation, so that the interfacial tension and viscosity are such as to favor the existence of the two continuous phases. After curing, the aqueous phase is readily removed by simple evaporation, yielding the microporous product.

Where a silica sol is employed in the formulation as the source of hydrous silica gel, it gels in the resulting mixture, thus forming hydrous silica gel in situ. The preparation of a sol of silica is well within the skill of workers in the art and need not be described here. A silica sol is, as is well known in the art, a colloidal solution of hydrous silica in water. The neutral or alkaline sol, upon admixture with the resin and the sodium hydroxide, becomes gelled in a short time, depending upon the exact pH and composition.

Ordinarily I employ the preformed hydrous silica gel. Usually it has been pressed to about 75% water content. The pressed material is dry to the touch and is friable and crushable between the fingers. The manufacture of hydrous silica gel suitable for use in the present invention is described in detail in the United States Patent to Baty et al. 2,329,322.

I may use any alkali metal hydroxide in carrying out my invention. However in commercial practice, sodium hydroxide will almost invariably be employed. Nevertheless it is to be understood that I may use potassium hydroxide and, were the cost not prohibitive, I might even use lithium hydroxide. As has been stated, the alkali metal hydroxide may be derived from the alkali silicate where alkali silicate is used to furnish the hydrous silica gel required for the practice of my invention.

An essential feature of my invention is the use of a relatively large amount of water in the formulation. This water is retained by the hydrous silica gel during the non-evaporative curing step wherein the resin is caused to polymerize and gel to a solid state. This water is distributed and is retained in such manner that two interlacing or continuous phases namely one of solid set resin and one of water are formed. Upon removal of the water by subsequent drying the microporous product is obtained.

An essential ingredient of my composition is the polymerization catalyst which is required to cause the desired copolymerization between the esterification product of the unsaturated dicarboxylic acid with the glycol and the liquid monomeric unsaturated polymerizable ethylenic compound such as styrene. I may use any of the polymerization catalysts disclosed in the patent to Ellis 2,255,313 mentioned above. Almost invariably in commercial practice the catalyst will be benzoyl peroxide. Alternatively it may be a peroxide of an aliphatic acid such as acetyl peroxide. Another peroxide which has recently attained commercial importance and which may be employed is tertiary butyl hydroperoxide. Still another catalyst which may be used is ascaridole. The catalyst employed should be soluble in the organic phase of the formulation so that it will be effective to promote the desired polymerization.

One feature which distinguishes my invention from the making of microporous plastics generally is the extremely low viscosity of the initial polymerizable mixtures which I employ.

Another feature of my invention which distinguishes it from making microporous plastics generally, for example in accordance with Baty et al. 2,329,322, is the employment of sodium hydroxide (or its equivalent such as potassium or lithium hydroxide or its addition in the form of sodium silicate) which alkali combines with the alkyd and causes it to act as its own wetting agent, the alkyd containing free unesterified carboxylic acid groups. This makes possible the homogeneous incorporation of a relatively large proportion of water and of hydrous silica gel or material forming same in situ such as a silica sol or sodium silicate, with the liquid organic resin-forming phase. Normally, in the absence of the alkali, the two phases of resin-forming organic material and water will not mix to give a homogeneous mixture. I have further determined that when ordinary wetting agents are used instead of alkali, the results are distinctly unsatisfactory. My invention therefore may be said to involve the preparation and employment of a self-wetting resin-forming material together with a source of hydrous silica gel and water. The hydrous silica gel is an essential part of the formulation and cannot be omitted. Apparently the hydrous silica gel operates to hold the water in the composition in such manner as to give the desired microporous product.

Ordinary commercial silica gel cannot be used in carrying out the present invention because it does not hold enough water to give a highly microporous product. Silica gel of commerce is a vitreous material which has been dehydrated beyond the point at which it can be re-hydrated. The hydrous silica gel used in accordance with the present invention has not been dehydrated beyond the point of reversibility and will generally contain between 55 and 85% by weight of water.

The relative proportions of the several ingredients used in carrying out the present invention may be varied over wide limits. The proportion of water in the mixture will generally range between 75 and 200 and preferably between 75 and 150 parts by weight per 100 parts by weight of resin-forming materials (namely, the esterification product and the unsaturated material copolymerizable therewith). The proportion of hydrous silica gel employed should be sufficient to retain all of this water in the composition during the curing step. In computing the amount of water, all the water in the alkali solution, sodium silicate solution, silica sol, or hydrous silica gel should be taken into account. The hydrous silica gel will usually be present in the mixture in an amount sufficient to give a product having from 50 to 60% of micropores. These are preferred limits of microporosity of the product. Higher or lower microporosities may be obtained if desired but are ordinarily undesirable. The strength of the product is adversely affected at microporosities substantially above 60%.

The proportions of the esterification product and the copolymerizable ethylenic material such as styrene need not be stated because they are given in the Ellis patent referred to above. The relative proportions of the esterification product and the alkali should be such that the pH of the mixture or formulation is below 7, say between 5 and 6.9, in order to effect gelling in the cases where sodium silicate or silica sol is employed and to maintain the hydrous silica in the gel form as for example where preformed hydrous silica is employed. The amount of the alkali may be roughly equivalent to the acid equivalent of the alkyd employed to form the resin.

The proportion of polymerization catalyst should be such as to accomplish polymerization of the resin-forming materials. Generally it will be about 2% by weight of the resin-forming components; however it may vary from 0.5 to 5% by weight thereof. The amount of sodium hydroxide will generally vary from about 1 to about 5% by weight based on the resin-forming components. If sodium silicate is used, the equivalent of sodium hydroxide may readily be calculated by methods known to those skilled in the art. The proportion of hydrous silica gel (calculated as anhydrous $SiO_2$) may vary from 10 to 40% by weight based on the weight of the resin-forming components.

Following formulation, and gelling of the hydrous silica gel in the case where sodium silicate or a silica sol is employed, the mixture is shaped to the desired form. It is then cured under non-evaporative conditions to effect polymerization of the resin-forming components and conversion to a solid mass which entraps the water as a continuous phase permeating the continuous resin phase. The mixture may be cured at any suitable temperature which will effect polymerization of the resin-forming components. Generally curing temperatures ranging from 70° to 150° C. are employed. When temperatures from 70° to 100° C. are used the curing may be effected at atmospheric pressure. If temperatures above 100° C. are used, suitable provision must be made to retain the water, and this necessitates the use of closed pressure-resisting curing equipment in order to prevent escape of steam. Where the cure is effected at super-atmospheric pressure, for example as in autoclave at temperatures ranging from above 100° C. up to say 150° C., steps must be taken to prevent puffing of the product upon release of the pressure to atmospheric. Puffing is best prevented by cooling the cured product down to below 100° C. before releasing the pressure.

The term "microporous" has attained a well established meaning in the art, and designates a material which has generally a high percentage of continuously interconnecting void spaces permeating a solid matrix, a large proportion of the voids having diameters considerably less than 0.001 inch (25 mu). The microporosity of the product of my invention is the result of the presence of two continuous phases, one resinous and one aqueous, which are locked in position by gelation of the resin as polymerization under non-evaporative conditions thereof takes place.

*Examples*

In Examples 1 to 3 there were employed as the resin-forming components diethylene glycol maleic anhydride esterification product, and styrene. Forty-one parts by weight of diethylene glycol and 36 parts by weight of maleic anhydride (mole ratio 1.05/1.00) were first reacted together to give an esterification product having an acid number of 30. Seventy parts of the resulting esterification product were dissolved in 30 parts by weight of styrene. The resulting material was employed as the resin-forming material designated in the table below. This material was admixed with the other ingredients in the proportions set forth in the table to give a mobile paste.

|  | Example 1 | Example 2 | Example 3 |
|---|---|---|---|
| Resin-forming components | 100 | 100 | 100 |
| Benzoyl peroxide | 2 | 2 | 2 |
| 10% NaOH solution |  | 20 | 20 |
| Commercial sodium silicate (63% $H_2O$) (commercial "N" grade $Na_2Si_4O_9$, 39° Baumé) | 50 |  |  |
| Water | 100 |  | 25 |
| Neutral silica sol (86% $H_2O$) |  | 100 |  |
| Pressed hydrous silica gel (75% $H_2O$) |  |  | 150 |

After the compositions of the foregoing examples were suitably mixed, the pastes were poured onto a glass plate. Metal spacers about .040 inch thick were placed at opposite edges. A second glass plate was then superimposed and the paste was flowed out by squeezing the plates together. The plates were then clamped together with heavy spring clips and the material was then heated for one hour at 70° to 80° C. which caused gelling of the resin in the mixtures without loss of water. The mold was then opened and the product was stripped from the glass and exposed to the air to dry out either at room or elevated temperature. The flat sheet was then finally dried by heating for one hour at 110° C. while exposed to the air. The formulation can be polymerized continuously very rapidly—for example, in a matter of minutes—provided that temperatures of 110° C. to 150° C. are employed.

An indication of the physical properties of the products of the present invention can be obtained from the following table of physical characteristics of the product made in accordance with Example 3 above:

Tensile strength, p. s. i. _____ 290
Elongation at break, per cent _____ 3
Impact, ft. lbs./sq. inch _____ 0.44
Density, g./cc. _____ 0.66
Voids, per cent _____ 52

A simple test has been used to indicate the relative porosity of the microporous product of the present invention, as follows. A drop of water from an eye dropper is placed on the sample and the time for the drop to be completely absorbed is noted. This time depends on pore size, among other things, and can be somewhat misleading for this reason. However, microscopic examinations indicate that the structure of the microporous resin material of the present invention is very similar to that of standard microporous hard rubber. Thus microporous hard rubber battery separators show a drop absorption time of from 5 to 9 seconds. The microporous product of the present invention generally shows times of absorption of from one to 30 seconds.

The percentage of voids in the microporous resinous product of the present invention depends upon the amount of water incorporated in the formulation. This is indicated by the following table which reports data obtained on a series of formulations made exactly as in Example 1 above except that the percentage of water in the formulation was varied as indicated.

[Variation of per cent voids with water content—Formulation same as Example 1 above except that water content varied.]

|  | A | B | C | D | E | F |
|---|---|---|---|---|---|---|
| Volume per cent $H_2O$ in formula | 49 | 56 | 61 | 65 | 68 | 73 |
| Density of product | .73 | .63 | .58 | .52 | .50 | .45 |
| Per cent voids in product | 47 | 54 | 58 | 62 | 64 | 67 |
| Drop absorption, seconds | 40 | 10 | 2 | 2 |  |  |

In the table just given the solid portion of the product is taken to have a density of 1.37 grams per cc.

The chemical resistance of the microporous resinous product of the present invention appears very satisfactory since boiling of samples made in accordance with the foregoing examples for 30 minutes in 33.4% aqueous $H_2SO_4$ containing 1% of added potassium dichromate had no detectable effect on the samples.

The liquid resin formulations used in accordance with the present invention before curing are essentially pastes whether prepared with sodium silicate, silica sol, or silica gel. The acidity of the alkyd end groups in the esterification product which enters into the resin-forming reaction acts to cause the formation of hydrous silica gel in situ when sodium silicate or silica sol is employed. By suitable choice of the resin-forming components and control of the pH of the mixture, very low viscosity emulsions can be formed, and the formation of hydrous silica gel can be delayed for minutes or hours. However, no particular advantage has been found in such delay, so that in most formulations the silica gel is allowed to form before the mixing is completed. When silica gelation begins the mixture suddenly changes from a low viscosity emulsion to a paste and exhibits a moderate yield strength and an increased viscosity. The general character of the white creamy paste formed can be varied from a thin paste to an exceedingly stiff but wet paste by variations in resin viscosity, water content or hydrous silica gel content. The usual formulations are of such consistency that they are easily stirred but will barely pour from a small beaker.

From the foregoing detailed description of my invention, many advantages thereof will be apparent to those skilled in the art. The principal advantage is that a simple and economical method of making a microporous synthetic resinous material, wherein the resin is of the type disclosed in the Ellis Patent No. 2,255,313, is provided. Another advantage is that the use of alkali causes the resin to be converted into an effective wetting agent which is distributed uniformly throughout the resin and is actually attached to the molecules of the alkyd. This promotes much more effective intermixture of the aqueous material containing hydrous silica or materials capable of forming same. Also the alkali salt of the alkyd is readily capable of copolymerization and entering into the resin-forming reaction so that loss thereof is not involved. Other advantages are that the product of the present invention has excellent microporosity and good strength, as well as good acid-resistance, so that it can be considered as a material for replacing the commercial microporous hard rubber battery separators and other electrolytic diaphragms. The chemical resistance of the material of the present invention relative to battery acids and oxidizing conditions up to 180° F. is very satisfactory. The chemical properties of the product of the present invention are such that self-discharge of the battery is not catalyzed thereby. The material cost of the product of the present invention is low. The product can be caused to cure in a very short period of time. The process is considerably simpler than that of making microporous hard rubber battery separators. Many other advantages of the process and products of the present invention will be apparent to those skilled in the art.

In accordance with standard usage, the term "dicarboxylic acid" as used herein and in the claims denotes both the acids as well as their anhydrides, especially maleic anhydride.

Having thus described my invention, what I claim and desire to protect by Letters Patent is:

1. The process of making a microporous resinous solid product which comprises forming a mixture of an esterification product of an ethylenic alpha, beta-dicarboxylic acid with a glycol, said esterification product being an advanced linear polyester containing unesterified carboxyl groups and having an acid number of from 5 to 100 and being soluble in and copolymerizable with the liquid monomeric unsaturated polymerizable compound containing an ethylenic linkage hereinafter mentioned to yield a solid resinous material, a liquid monomeric unsaturated polymerizable compound containing an ethylenic linkage and being water-immiscible, an alkali metal hydroxide, the relative amounts of said esterification product and said alkali metal hydroxide being such that said mixture has a pH of from 5 to 6.9, hydrous silica gel, water, the amount of silica gel being sufficient to retain all of the water present in the system, and a polymerization catalyst, and curing said mixture to a solid form by heating under non-evaporative polymerization conditions.

2. The process of making a microporous resinous solid product which comprises forming a mixture of an esterification product of maleic acid with a glycol, said esterification product being an advanced linear polyester containing unesterified carboxyl groups and having an acid number of from 5 to 100 and being soluble in and copolymerizable with the liquid monomeric unsaturated polymerizable compound containing an ethylenic linkage hereinafter mentioned to yield a solid resinous material, a liquid monomeric unsaturated polymerizable compound containing an ethylenic linkage and being water-immiscible, an alkali metal hydroxide, the relative amounts of said esterification product and said alkali metal hydroxide being such that said mixture has a pH of from 5 to 6.9, hydrous silica gel, water, the amount of silica gel being sufficient to retain all of the water present in the system, and a polymerization catalyst, and curing said mixture to a solid mass by heating under non-evaporative polymerization conditions.

3. The process of making a microporous resinous solid product which comprises forming a mixture of an esterification product of maleic acid and a glycol, said esterification product being an advanced linear polyester containing unesterified carboxyl groups and having an acid number of from 5 to 100 and being soluble in and copolymerizable with the styrene hereinafter mentioned to yield a solid resinous material, styrene, an alkali metal hydroxide, the relative amounts of said esterification product and said alkali metal hydroxide being such that said mixture has a pH of from 5 to 6.9, hydrous silica gel, water, the amount of silica gel being sufficient to retain all of the water present in the system, and a polymerization catalyst, and curing said mixture to a solid mass by heating under non-evaporative polymerization conditions.

4. The process of making a microporous resinous product which comprises forming a mixture of an esterification product of an ethylenic alpha, beta-dicarboxylic acid with a glycol, said esterification product being an advanced linear polyester containing unesterified carboxyl groups and having an acid number of from 5 to 100 and being soluble in and copolymerizable with the liquid monomeric unsaturated polymerizable compound containing an ethylenic linkage hereinafter mentioned to yield a solid resinous material, a liquid monomeric unsaturated polymerizable compound containing an ethylenic linkage and being water-immiscible, sodium silicate, sodium hydroxide water and a polymerization catalyst, adjusting the relative proportions of said esterification product and said sodium hydroxide so that said mixture has a pH of from 5 to 6.9 whereby spontaneous gelling of said sodium silicate occurs with formation in situ of hydrous silica gel in amount sufficient to retain all of the water present in the system and curing said mixture to a solid mass by heating under non-evaporative polymerization conditions.

5. The process of making a microporous resinous product which comprises forming a mixture of an esterification product of an ethylenic alpha, beta-dicarboxylic acid with a glycol, said esterification product being an advanced linear polyester containing unesterified carboxyl groups and having an acid number of from 5 to 100 and being soluble in and copolymerizable with the liquid monomeric unsaturated polymerizable compound containing an ethylenic linkage hereinafter mentioned to yield a solid resinous material, a liquid monomeric unsaturated polymerizable compound containing an ethylenic linkage and being water-immiscible, an alkali metal hydroxide, the relative amounts of said esterification product and said alkali metal hydroxide being such that said mixture has a pH of from 5 to 6.9, an aqueous silica sol, water, said hydrous silica sol spontaneously gelling with formation in situ of hydrous silica gel in amount sufficient to retain all of the water present in the system and a polymerization catalyst, and curing said mixture to a solid mass by heating under non-evaporative polymerization conditions.

6. The process of making a microporous resinous product which comprises admixing an esterification product of an ethylenic alpha, beta-dicarboxylic acid with a glycol, said esterification product being an advanced linear polyester containing unesterified carboxyl groups and having an acid number of from 5 to 100 and being soluble in and copolymerizable with the liquid monomeric unsaturated polymerizable compound containing an ethylenic linkage hereinafter mentioned to yield a solid resinous material, a liquid monomeric unsaturated polymerizable compound containing an ethylenic linkage and being water-immiscible, an alkali metal hydroxide, the relative amounts of said esterification product and said alkali metal hydroxide being such that said mixture has a pH of from 5 to 6.9, preformed hydrous silica gel, water, the amount of silica gel being sufficient to retain all of the water present in the system, and a polymerization catalyst, and curing said mixture to a solid mass by heating under non-evaporative polymerization conditions.

7. The process of claim 1 wherein said alkali metal hydroxide is present in amount ranging from 1 to 5% by weight based on the weight of the resin-forming components, said hydrous silica gel is present in amount (calculated as anhydrous $SiO_2$) ranging from 10 to 40% by weight based on the weight of said resin-forming components, and said water is present in amount ranging from 75 to 200 parts by weight based on the weight of said resin-forming components.

8. A microporous synthetic resinous product produced by the process of claim 1.

9. A microporous synthetic resinous product produced by the process of claim 2.

10. A microporous synthetic resinous product produced by the process of claim 3.

11. A process of making a microporous synthetic resinous product which comprises forming a mixture of a linear polyester which is the product obtained by reacting an ethylenic alpha,beta-dicarboxylic acid with a glycol in such proportions that there are present in the reacting mixture about one carboxyl group in such unsaturated acid to one hydroxyl group in such glycol to an advanced stage of esterification but short of becoming completely insoluble and infusible until a product having an acid number of from 5 to 100 is produced which is soluble in the liquid monomeric unsaturated polymerizable compound containing an ethylenic linkage hereinafter mentioned, a liquid monomeric unsaturated polymerizable compound containing an ethylenic linkage and being water-immiscible, said polyester being copolymerizable with said liquid monomeric compound to yield a solid resinous material, an alkali metal hydroxide in an amount such that said mixture has a pH of from 5 to 6.9, water in an amount ranging from 75 to 200 per cent based on the weight of said polyester and said liquid monomeric compound, hydrous silica gel in an amount ranging from 10 to 40 per cent (calculated as anhydrous $SiO_2$) based on the weight of said polyester and said liquid monomeric compound, and a polymerization catalyst capable of effecting copolymerization of said polyester and said liquid monomeric compound, said mixture comprising two continuous interlaced phases one of which is aqueous and the other of which is organic, and curing said mixture to a solid mass by heating same under non-evaporative polymerization conditions.

12. A microporous synthetic resinous product produced by the process of claim 11.

13. A process as recited in claim 11 wherein said acid is maleic acid and wherein said liquid monomeric compound is styrene.

14. A microporous synthetic resinous product produced by the process of claim 11 wherein said acid is maleic acid and wherein said liquid monomeric compound is styrene.

15. A process of making a microporous synthetic resinous product which comprises forming a mixture of an alkali metal salt of a linear polyester which is the product obtained by reacting an ethylenic alpha, beta-dicarboxylic acid with a glycol in such proportions that there are present in the reacting mixture about one carboxyl group in such unsaturated acid to one hydroxyl group in such glycol to an advanced stage of esterification but short of becoming completely insoluble and infusible until a product having an acid number of from 5 to 100 is produced which is soluble in the liquid monomeric unsaturated polymerizable compound containing an ethylenic linkage hereinafter mentioned, a liquid monomeric unsaturated polymerizable compound containing an ethylenic linkage and being water-immiscible, said polyester being copolymerizable with said liquid monomeric compound to yield a solid resinous material, water in an amount ranging from 75 to 200 per cent based on the weight of said polyester and said liquid monomeric compound, hydrous silica gel in an amount ranging from 10 to 40 per cent (calculated as anhydrous $SiO_2$) based on the weight of said liquid monomeric compound, and a polymerization catalyst capable of effecting copolymerization of said alkali metal salt of said polyester and said liquid monomeric compound, the pH of said mixture being from 5 to 6.9, said mixture comprising two continuous interlaced phases one of which is aqueous and the other of which is organic, and curing said mixture to a solid mass by heating same under non-evaporative polymerization conditions.

CHARLES F. FISK.

REFERENCES CITED

The following references are of record in the file of this patent:

UNITED STATES PATENTS

| Number | Name | Date |
| --- | --- | --- |
| 2,096,933 | Burgess | Oct. 26, 1937 |
| 2,112,529 | Hazell | Mar. 29, 1938 |
| 2,175,798 | Hauser | Oct. 10, 1939 |
| 2,255,313 | Ellis | Sept. 9, 1941 |
| 2,329,322 | Baty et al. | Sept. 14, 1943 |
| 2,353,877 | Chollar | July 18, 1944 |
| 2,409,633 | Kropa | Oct. 22, 1946 |

OTHER REFERENCES

Sacha, pages 173–176, Modern Plastics, December 1945.